Sept. 2, 1969  S. FRIEDLANDER  3,464,796
METHOD OF DETERMINING AREA
Filed Oct. 31, 1966
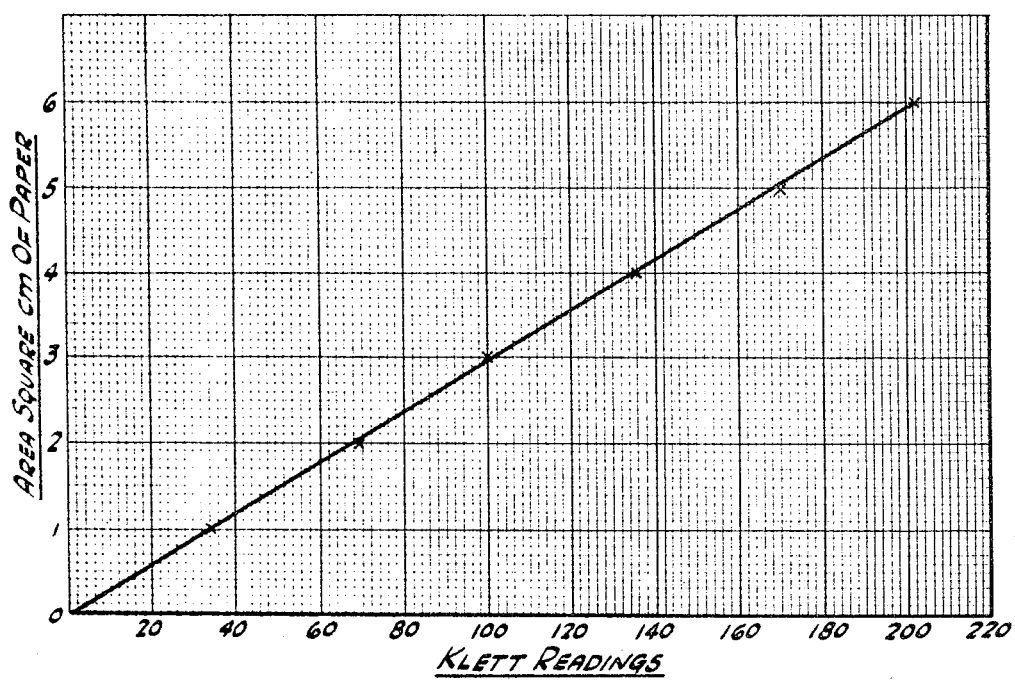
INVENTOR.
SAUL FRIEDLANDER
BY
Lothrop & West
ATTORNEYS 3,464,796
METHOD OF DETERMINING AREA
Saul Friedlander, 1127 45th St.,
Sacramento, Calif. 95819
Filed Oct. 31, 1966, Ser. No. 590,810
Int. Cl. G01n 31/08
U.S. Cl. 23—230                                   7 Claims

ABSTRACT OF THE DISCLOSURE

In order to determine an unknown area delineated on a piece of thin base material, such as paper, the paper is previously treated with a predetermined chemical capable of being uniformly eluted by a standardized solution. After delineation of the unknown area on the treated paper, the unknown area portion of the paper is cut out and the chemical eluted therefrom by the standardized solution. This is followed by comparing the amount of chemical yielded by the cut-out portion of the paper with the amount of chemical eluted by the standardized solution from a known area of treated paper.

---

The invention relates to a process for determining the area enclosed in or delineated by a geometric plane figure; and, more particularly, to planimetric determinations by colorimetric analysis of chemically treated paper.

In science, engineering, architecture, weather forecasting, and throughout all phases of industry, business, and construction, among others, a constantly recurring problem is that of determining the areas of figures drawn to a predetermined scale on paper.

Where the area to be determined is irregular, for example, the area under, or enclosed by, the curve of a recorder, the problem of planimetry becomes especially difficult.

For the most part, planimetry has heretofore been accomplished in these situations in five ways, namely: (1) geometric calculations from lines drawn on the curve and using, for example, Simpson's Rule or Gaussian Peaks; (2) mechanical planimeter; (3) cutting out the curve and weighing the paper on a fine chemical balance; (4) the use of a disc integrator; and (5) the use of an electronic integrator.

The geometric determination is laborious; the mechanical planimeter is relatively inaccurate; the cut-out-and-weigh process is subject to errors from moisture; the use of a disc integrator is rather expensive; and the electronic integrator is very expensive, such devices costing in the neighborhood of $7,000.

It is therefore an object of the present invention to provide a method of determining area which is quick, accurate and economical.

It is another object of the invention to provide a method of determining area which can readily be learned and practiced even by relatively unskilled personnel.

It is a further object of the invention to provide a planimetric process which requires but a minimum of equipment and material.

It is another object of the invention to provide a generally improved method of determining area.

Other objects, together with the foregoing, are attained in the method described in the following description, and of which one example of the practice thereof is illustrated in the accompanying figure which shows the substantially linear relation existing between Klett colorimeter readings and areas of certain chemically treated paper.

The process of the invention commences with the drawing, or marking, of the geometrical configuration, whose area is to be determined on a sheet of specially treated paper. This merely entails the substitution of specially treated paper for the customary untreated graph or recorder paper heretofore used.

The special treatment of the paper includes the addition thereto of a chemical, such as a dye.

It is important that the chemical be uniformly distributed, or applied in a known distribution, to the sheet, so that regardless of which portion of the paper is marked with the geometric configuration for subsequent processing, the marked portion is susceptible of comparison with one or more units of known value.

It is also desirable that where the chemical applied to the paper is a dye, that the paper, when dry, be relatively colorless or light in tone; yet, when eluted into a solution, that the dyed solution be reasonably deep in color.

This requirement poses no serious problem to paper manufacturers who can, it is believed, even in mass production, readily incorporate in their graph paper, recorder paper, or other paper, a chemical which is evenly distributed throughout the paper, and which, in the event the chemical is a dye, can meet the desirable qualities set forth above as to wet and dry color intensities.

On an experimental basis, I have produced a uniformly sensitized paper possessing quite satisfactory characteristics. Starting with conventional graph or recorder paper, I soaked the paper in a very weak solution of serum protein, such as alubumin. More particularly, I used 0.5 cc. of human blood serum diluted in 200 cc. of a normal (0.85% NaCl) saline solution. Then, the paper was allowed to dry. Next, the paper was stained with a solution of bromphenol blue and rinsed in a weak alkaline solution (0.5% lithium carbonate) to produce a light blue color. The paper was then allowed to dry, the blue color of the dry paper being moderately light in intensity.

Upon immersing the paper so treated in a 5% sodium carbonate solution, all of the color was rapidly eluted and imparted a reasonably intense blue color to the solution.

The technical problem, in other words, of uniformly impregnating suitable chemicals in paper for various types of uses is not difficult.

Having produced a paper possessing the desired characteristics, an experiment was made to determine the relation between the area of the chemically sensitized paper and the light absorption of the solution dyed thereby.

Dry, treated paper of the kind mentioned above was cut into six pieces measuring, in area, 1 square centimeter, 2 square centimeters, 3 square centimeters, 4 square centimeters, 5 square centimeters and 6 square centimeters.

Each piece of paper was thereupon immersed in an individual Klett tube, each of the tubes containing 5 cc. of the 5% sodium carbonate solution. It was observed that in each case the solution quickly eluted the dye in the paper. Then, in each Klett tube, the paper was pushed to the bottom of the tube and the light absorption of each of the six solutions was measured on a Klett-Summerson Colorimeter using a green filter with a wave length of 530 milli-microns.

It is to be noted at this juncture that while a Klett-Summerson Colorimeter was utilized in this particular experiment, any other appropriate apparatus, such as spectrophotometers, could also be used, bearing in mind that the property of the chemical (dye, in this case) being measured was light transmittance, or, conversely, light absorbance (optical density).

On graph paper, the Klett readings were plotted as indicated in the figure, the results showing the function to be substantially linear. In tabular form, the readings were as follow:

| Area of sensitized paper (cm.²) | Klett readings |
|---|---|
| 1 | 34 |
| 2 | 69 |
| 3 | 100 |
| 4 | 136 |
| 5 | 169 |
| 6 | 202 |

With the relationship indicated in the figure, it becomes a relatively simple and quick matter to ascertain any unknown area, regardless of the irregularity of its outline.

For example, assume that the unknown area is a curve marked on the sensitized paper by a recorder, such as an electronic chromatographic recorder, and it is desired to know the concentration of a chemical indicated by the recorder. It is only necessary to cut out the figure delineated by the line inked by the recorder. This cut-out piece of paper of unknown area is thereupon immersed in a standardized solution, that is to say, a solution having the same composition as that previously used to elute the dye from one or more pieces of treated paper of known area, and of which colorimeter or spectrophotometer light absorption or transmission readings have been made. A colorimetric or spectrophotometric reading is then taken of the solution and, by reference to a graph plotted from the known values, with absorption or transmission of light, as the abscissa, and area as the ordinate, for example, the unknown area of the paper can immediately be determined.

Referring to the figure, it can be seen, for example, that if the Klett colorimeter indicated a value of 120 for the unknown, the area of the paper is approximately 3.55 square centimeters. This area, in turn, would correspond, depending on the scale used, to a certain concentration of a chemical, for example.

It is realized that the use of differing dyes will perhaps result in families of curves, and that all of the curves need not necessarily be linear in nature.

It is also suggested that chemicals other than dyes may be utilized as the sensitizing agent, and that properties other than light absorptivity might be taken advantage of. Examplary would be a chemical which, when dissolved in a standardized solution, would afford an electrical conductivity which varies in dependence upon the amount of chemical eluted from the sensitized paper. Another property might be turbidity.

It can therefore be seen that by suitably treating paper in a uniform, or other known manner, the unknown area of a figure drawn on the sensitized paper to a predetermined scale can readily, accurately an inexpensively be determined by cutting out the figure and eluting the same into a standardized solution, followed by measuring at least one selected property thereof and comparing the same with pre-established values determined under the same controlled conditions.

What is claimed is:

1. A method of determining an unknown area under a curve delineated on paper uniformly treated with a predetermined chemical capable of being uniformly eluted by a standardized solution, said method comprising the steps of:

(a) measuring the amount of said predetermined chemical yielded to said solution by elution of at least one piece of said paper of known area by the standardized solution;

(b) cutting out of said paper the unknown area portion thereof under said curve;

(c) measuring the amount of said predetermined chemical yielded to said solution of elution of said cut out portion of said paper by the same amount of the standardized solution; and, (d) comparing the relative amounts of said chemical yielded by said piece of paper of known area and by said cut out portion of unknown area.

2. A method of determining area as in claim 1 wherein said chemical is a dye effective to color said standardized solution, and wherein the property used to measure said amounts of said chemical is light absorbance.

3. A method of determining area as in claim 2 wherein said dye is bromphenol blue.

4. A method of determining area as in claim 3 wherein said standardized solution comprises a solution of sodium carbonate.

5. A method of determining area as in claim 4 wherein said treated paper is produced by the steps of soaking said paper in a solution including approximately 0.5 cc. of serum protein diluted in 200 cc. of saline solution comprising approximately 0.85 gram sodium chloride to 100 cc. of water, allowing said paper to dry, staining said paper with bromphenol blue, rinsing said paper in a weak alkaline solution to produce a light blue color, and allowing said paper to dry.

6. A method of determining area as in claim 5 wherein said weak alkaline solution is a 0.5 percent solution of lithium carbonate and said standardized solution is a 5 percent solution of sodium carbonate.

7. A method of determining an unknown area delineated on a piece of paper previously uniformly treated with a predetermined chemical capable of being uniformly eluted by a standardized solution, said method comprising the steps of:

(a) physically separating the unknown area portion of the piece of paper from the balance thereof;

(b) eluting the chemical from the unknown area portion of the paper by the standardized solution; and, (c) comparing the amount of chemical eluted in step b, with the amount of chemical eluted from a known area of the paper by the same amount of the standardized solution.

References Cited

UNITED STATES PATENTS

| 2,587,976 | 3/1952 | De Ment | 356—157 X |
| 2,631,491 | 3/1957 | Ragan et al. | 356—157 |
| 2,672,403 | 3/1954 | Johnson et al. | 23—230 |
| 2,851,881 | 9/1958 | Daniel et al. | 73—149 |

JOSEPH SCOVRONEK, Primary Examiner

U.S. Cl. X.R.

23—253; 33—1; 162—162; 356—157, 179, 201